(12) United States Patent
Lemke

(10) Patent No.: US 6,942,766 B2
(45) Date of Patent: Sep. 13, 2005

(54) CHLORINE GENERATOR

(76) Inventor: Chris Alan Lemke, 1791 29 Rd., Brainard, NE (US) 68626

( * ) Notice: Subject to any disclaimer, the term of this patent is extended or adjusted under 35 U.S.C. 154(b) by 133 days.

(21) Appl. No.: 10/346,405

(22) Filed: Jan. 16, 2003

(65) Prior Publication Data
US 2004/0140200 A1 Jul. 22, 2004

(51) Int. Cl.[7] .............................. C25B 1/26; C25B 9/08
(52) U.S. Cl. ........................ 204/242; 204/271; 205/618
(58) Field of Search .............................. 204/266, 230.2, 204/242, 271; 205/618–621

(56) References Cited

U.S. PATENT DOCUMENTS

| 3,962,065 | A |   | 6/1976  | Scoville |   |
|---|---|---|---|---|---|
| 4,076,603 | A |   | 2/1978  | Andersen |   |
| 4,097,356 | A |   | 6/1978  | Yates |   |
| 4,107,022 | A |   | 8/1978  | Strempel |   |
| 4,142,950 | A |   | 3/1979  | Creamer |   |
| 4,250,126 | A |   | 2/1981  | Yates |   |
| 4,256,552 | A |   | 3/1981  | Sweeney |   |
| 4,363,713 | A |   | 12/1982 | Bindon |   |
| 4,484,991 | A |   | 11/1984 | Angelo |   |
| 4,555,323 | A |   | 11/1985 | Collier |   |
| 4,613,415 | A |   | 9/1986  | Wreath |   |
| 4,683,041 | A |   | 7/1987  | Seko |   |
| 4,693,806 | A |   | 9/1987  | Tucker |   |
| 4,713,170 | A | * | 12/1987 | Saibic ..................... | 204/228.6 |
| 4,724,059 | A |   | 2/1988  | Collier |   |
| 4,772,364 | A |   | 9/1988  | Dempsey |   |
| 4,976,842 | A | * | 12/1990 | Fowler ....................... | 204/252 |
| 5,037,519 | A | * | 8/1991  | Wiscombe ................... | 204/237 |
| 5,053,114 | A |   | 10/1991 | Maddock |   |
| 5,094,734 | A |   | 3/1992  | Torrado |   |
| 5,133,848 | A |   | 7/1992  | Meyers |   |
| 5,545,310 | A | * | 8/1996  | Silveri ........................ | 205/537 |
| 5,779,874 | A |   | 7/1998  | Lemke |   |
| 6,059,942 | A | * | 5/2000  | Barnes et al. ............... | 204/269 |
| 6,368,474 | B1 |   | 4/2002  | Wilkins |   |

OTHER PUBLICATIONS

Chemical Injection Technologies, Inc.(CIT), Safe–T–clor Information on web site at www.superiorchlorinators.com and various distributors of CIT, no date.

* cited by examiner

Primary Examiner—Roy King
Assistant Examiner—Harry D. Wilkins, III

(57) ABSTRACT

A chlorine generator cell (10) contains components that require physical isolation between the anode compartment (20), cathode compartment (30), and outside environment. The cell (10) also contains a membrane (50) that provides selective electrical conductivity between the anode compartment (20) and cathode compartment (30). The cell (10) consists of a series of pipe fittings that allow access to the interior of cell (10) for placement of water and salt to generate chlorine. The anode stem (71) and cathode stem (81) located outside of cell (10) are connected to a power supply (91). Power supply (91) may be further connected to a power controller (92) that allows for adjustment of the energy output of power supply (91) to the optimum energy level, thus the desired chlorine output. This invention provides a chlorine generator that is portable, yet is allows for expanded size with additional pipe fittings as needed. Furthermore, this invention allows multiple to infinite chlorine output levels with a single cell (10).

6 Claims, 3 Drawing Sheets

CHLORINE GENERATOR

CROSS-REFERENCE TO RELATED APPLICATIONS

Not applicable, or none.

STATEMENT REGARDING FEDERALLY SPONSORED RESEARCH OR DEVELOPMENT

Not applicable, or none.

REFERENCE TO SEQUENCE LISTING, A TABLE, OR A COMPUTER PROGRAM LISTING COMPACT DISK APPENDIX

Not applicable, or none.

BACKGROUND OF THE INVENTION

This invention relates, generally, to improvements in electrolytic cells that generate chlorine gas and caustic solutions and delivers those products to a drinking water supply system, wastewater treatment system, industrial processing system, or a swimming pool. More particularly, it relates to a portable chlorine generator that can be used in the field to generate chlorine from common salt to sanitize or oxidize water.

U.S. Pat. No. 6,368,474 (2002); U.S. Pat. No. 5,779,874 (1998); U.S. Pat. No. 5,133,848 (1992); U.S. Pat. No. 4,724,059 (1988) and the references to record therein are believed to represent the most relevant prior art to this disclosure.

Chlor-alkali cells provide an electromotive force to split the ionic bond between sodium and chlorine elements of ordinary sodium chloride (table salt). Chlorine is used as a disinfectant in water, wastewater, and swimming pool applications. Chlorine is also used as an oxidant in water, wastewater, and industrial treatment processes. The sodium produced from the process combines with water to form sodium hydroxide (caustic) which is used as a disinfectant and pH control chemical in water, wastewater and swimming pool applications. Caustic is also used as a cleansing chemical agent in several processes.

The chlor-alkali process in its simplest form, employs the use of an anode electrode, cathode electrode, a membrane placed between the two electrodes, and solutions called electrolytes. The process employs an electrical current within the electrolytes to generate the products of the process, mainly chlorine gas and sodium hydroxide (caustic soda). The components of the chlor-alkali process are contained within a cell. The cell in conjunction with the membrane provide isolation of the electrolytes generated at each electrode. The cell also provides isolation of the of the chlor-alkali process with the outside environment. The necessity of the cell and membrane to isolate the electrolytes is discussed extensively in the prior art. The necessity of the cell to isolate the chlor-alkali process from the environment is obvious since the products of the process are hazardous to the humans and the surrounding environment.

The electrolyte at the anode is generally referred as the anolyte, and is primarily water and salt producing a saturated saltwater brine solution. The electrolyte at the cathode is generally referred as the catholyte, and is primarily a solution of sodium hydroxide, or caustic soda. The need to isolate the electrolytes with a membrane are primarily for process control and efficiency.

The claims in the prior art describe apparatuses or methods utilizing numerous parts to generate chlorine from salt. Collier (U.S. Pat. No. 4,724,059), Meyers (U.S. Pat. No. 5,133,848) and Wilkins (U.S. Pat. No. 6,368,474) describe cells having two upward extending liquid holders that contain the process electrolytes. The Wilkins cell describes the use to sight tubes to view the electrolytes and a handle to facilitate the system mobility. Although these apparatuses illustrate portability, the inventions also illustrates numerous parts that utilize specialized molded or tooled components. The applicants U.S. Pat. No. 5,779,874 illustrates a simplified single wedge flanged cell system that contains electrolytes for chlorine production. Salt can be added to the cell through the anode opening and independently operated without an external brine supply system. This configuration is certainly applicable for portable and small chlorine applications; however, the cell requires anode removal to re-supply salt to the cell.

A need therefore exists for a portable chlorination system that is simple to manufacture with minimal parts that can be purchased without expensive tooling. Such system will be available to the consumer at a reduced capital cost with significant savings in operation and maintenance costs when compared to other chlorination systems. A simplified chlorine generator will also allow development and use in remote third world areas that certainly need inexpensive yet reliable chlorination devices.

BRIEF SUMMARY OF THE INVENTION

The present invention employs a chlor-alkali cell with one cell end connected to an anolyte compartment and the opposite cell end connected to the catholyte compartment. The cell and electrolyte compartments are constructed of typical pipe fittings of suitable material available from any hardware or plumbing supply store. The cell compartments shall allow controlled access from the exterior environment to allow the addition of salt and water for the process operation. The compartment can be of any size necessary to achieve the desired level of system portability. The power system may include a power controller consisting of a power cord, dimmer switch, and a power plug receptacle. With the power controller plugged into any 120 VAC power outlet, the operator can utilize any power supply source (i.e. battery charger) plugged into the power controller where the power supply amperage is controlled by adjusting the dimmer switch. The active power supply connected to the electrodes extending from the exterior of the electrolyte compartments generate chlorine gas that is swept from the anode compartment through a vacuum system connected to a fitting at the top of the compartment lid.

The present invention eliminates the various complicated means described in the earlier patents of apparatus construction. The present invention also allows the use of any direct current power supply to generate chlorine gas.

It is therefore understood that the primary objective of this invention is to provide a chlorine generator that is economical to construct and simple to install and maintain.

Accordingly, several objects and advantages of my invention are:

(a) to provide a cell having no specialized frame or divider system that requires added tooling or specialized training to install and operate;
(b) to provide cell compartments of sufficient size to house the salt and electrolytes;
(c) to design cell compartments with readily available components;
(d) to provide a power control system that allows the operator to utilize any direct current (DC) power supply on the chlorination system;

(e) to design a power control system that allows the operator to adjust the chlorine production output to the desired level;

Further objects and advantages will become apparent from a consideration of the ensuing description and drawings.

BRIEF DESCRIPTION OF THE SEVERAL VIEWS OF THE DRAWING

For a fuller understanding of the nature and objects of the invention, reference should be made to the following detailed description, taken in consideration with the accompanying drawings in which:

FIG. 1 illustrates a chlorine generator completely assembled and ready for operation.

FIG. 2 illustrates the order at which the cell compartments are assembled.

Numerical representations shown within the figures outlined above are referenced by the following components:

| | |
|---|---|
| 10 cell | |
| 20 anode compartment | 30 cathode compartment |
| 21 anode flange | 31 cathode flange |
| 22 anode opening | 32 cathode opening |
| 23 anode compartment opening | 33 cathode compartment opening |
| 24 anode lid | 34 cathode lid |
| 25 anolyte container | 35 catholyte container |
| 26 anode stem opening | 36 cathode stem opening |
| 27 anode compartment connector | 37 cathode compartment connector |
| 28 anode compartment base | 38 cathode compartment base |
| 29 anolyte port | 39 catholyte port |
| 40 cell compression collar | |
| 41 exterior compressive wedge | |
| 42 interior compressive wedge | |
| 44 compression collar opening | |
| 45 compression collar flange | |
| 50 membrane | |
| 60 anode seal | 61 cathode seal |
| 62 flange groove | |
| 63 anode stem seal | 65 cathode stem seal |
| 70 anode | 80 cathode |
| 71 anode stem | 81 cathode stem |
| 72 anode face | 82 cathode face |
| 90 electrical conduit | |
| 91 power supply | |
| 92 power control | |
| 94 plug receptacle | |
| 95 dimmer switch | |
| 96 power cord | |
| 99 alternating current (AC) power supply | |

DETAILED DESCRIPTION OF THE INVENTION

The configuration of the invention can partake several forms. It is the intention of this narrative to describe in detail the invention for a chlor-alkali system that produces 0.01–1.0 kilograms (0.02–2.2 pounds) of chlorine gas per day. Illustrations of this type of system are shown in FIGS. 1, 2, and 3.

Figure 1:
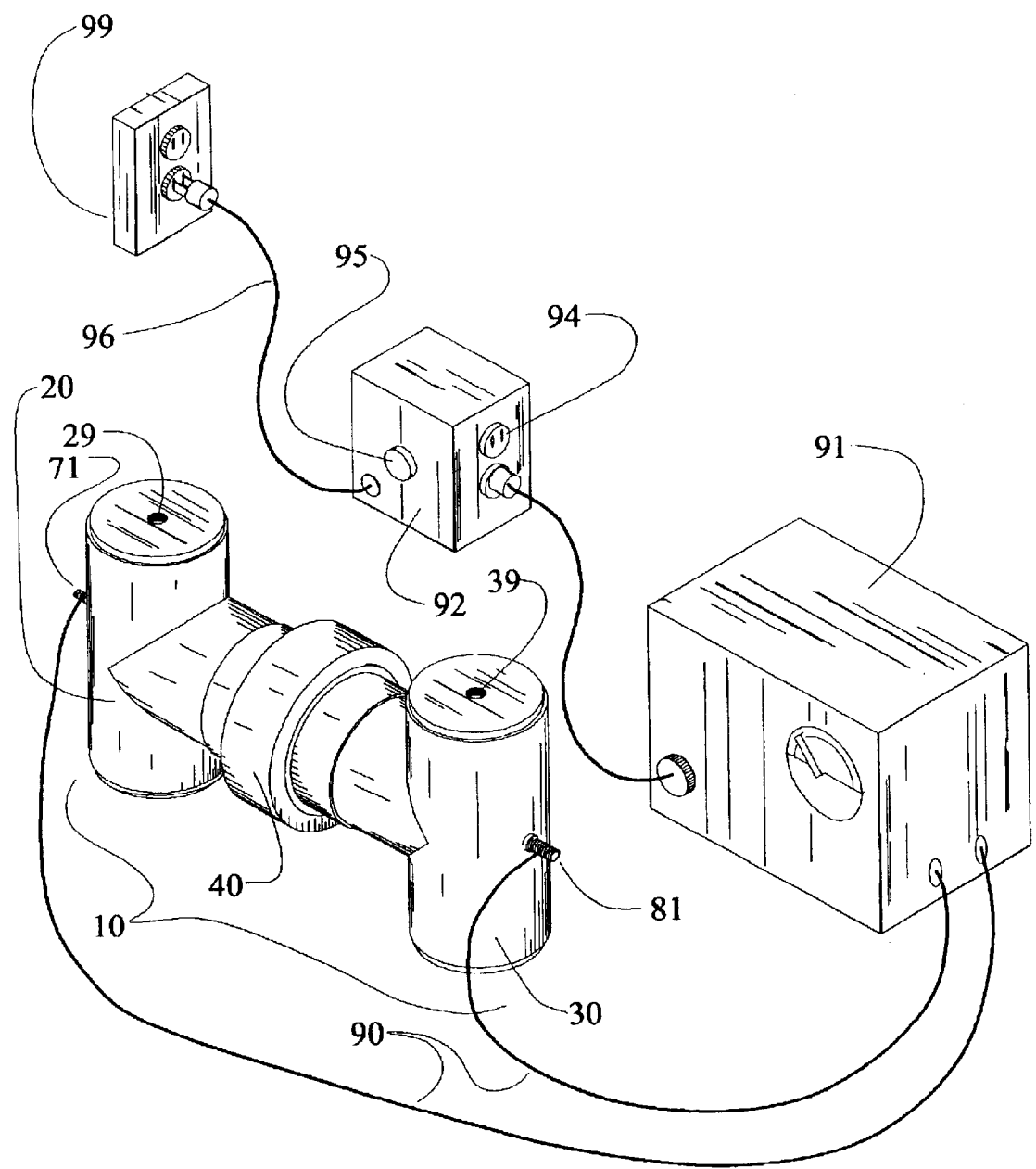
FIG. 1 is an isometric representation of the invention showing a power control system and direct current (DC) power source with electrical conduits connected to electrodes of a chlorine generator.

FIG. 1 is an isometric representation of the invention in its assembled form. As shown in FIG. 1, the invention is comprised of a cell 10 divided into an anode compartment 20 and a cathode compartment 30. Continuity or attachment of anode compartment 20 with cathode compartment 30 is provided by a cell compression collar 40.

Cell 10 is made of a rigid, non-electrically conductive material such as fiberglass, polyvinyl chloride (PVC) plastic, chlorinated polyvinyl chloride (CPVC) plastic, polyvinylidene fluoride (PVDF) plastic, polytetrafluoroethylene (PTFE) plastic or other plastics that are chemically resistant to the solutions and gases contained within cell 10. More specifically, the material of anode compartment 20 must be chemically resistant to chlorine gas, sodium chloride, sodium chloride brine, and anolyte contained in anode compartment 20. The material of cathode compartment 30 must be chemically resistant to hydrogen gas, sodium hydroxide, and a catholyte contained in cathode compartment 30.

Figure 2:
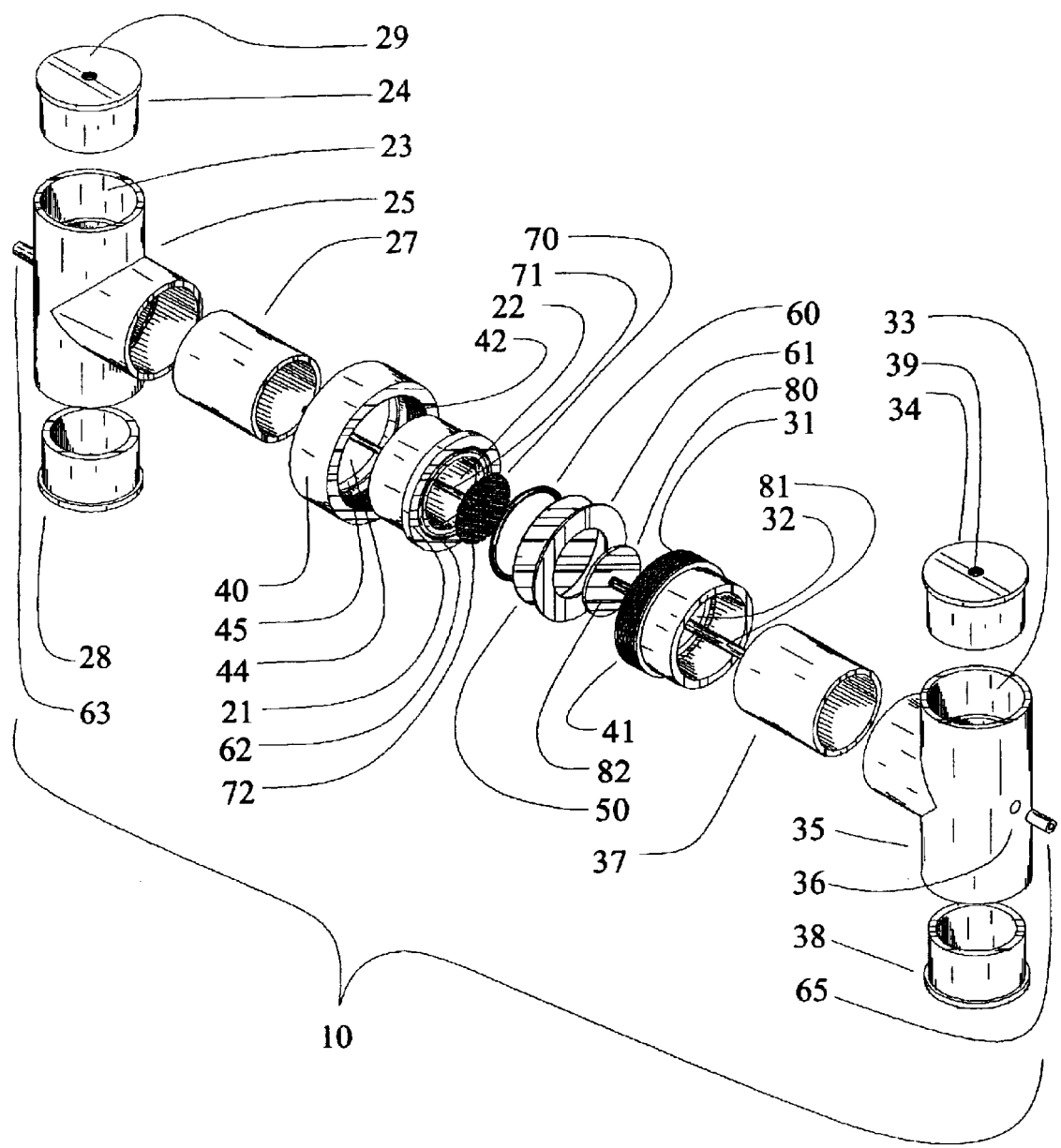
FIG. 2 is an isometric representation of the invention showing all the components of the chlorine generator.
Figure 3:
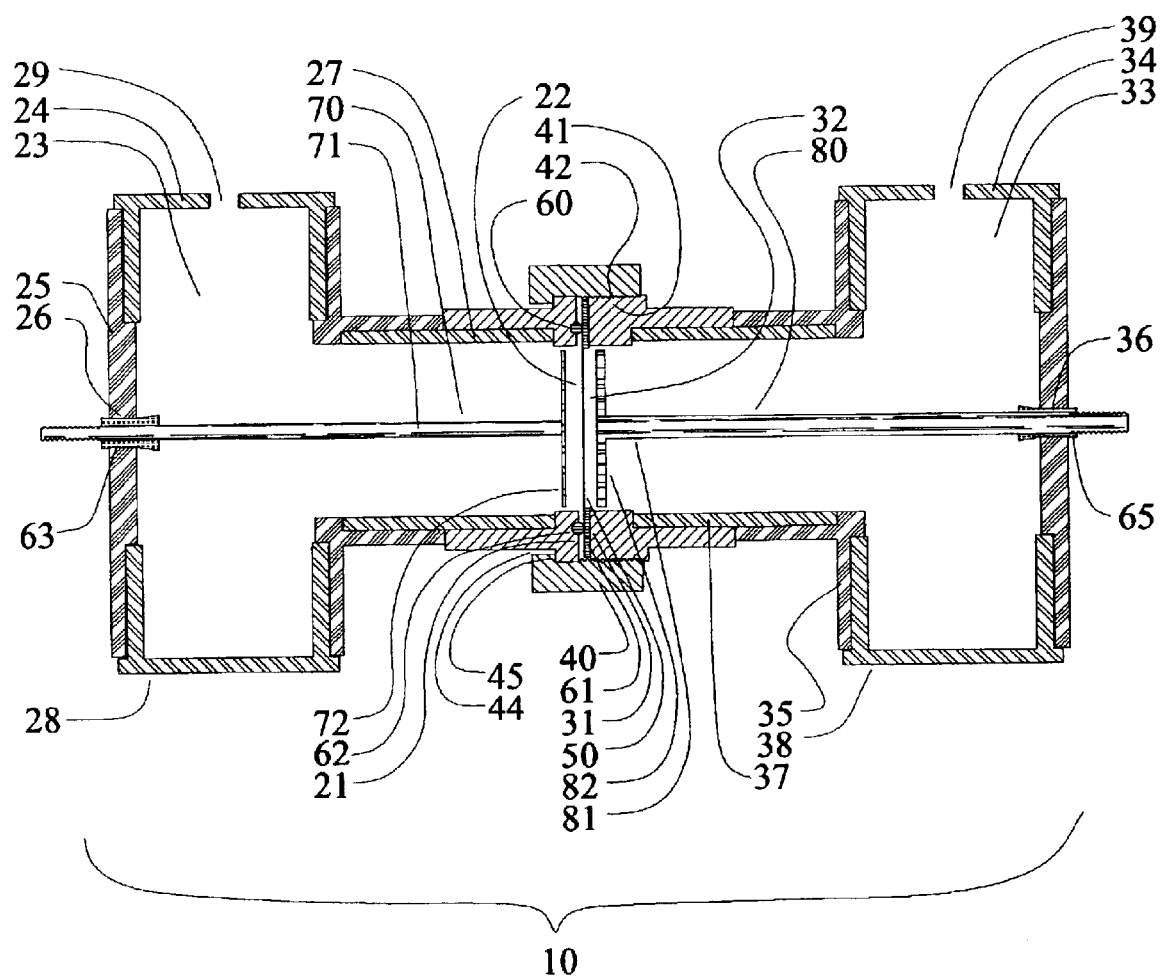
FIG. 3 is a cross-section of the chlorine generator showing the position of interior components.

FIG. 2 best illustrates the individual features of cell 10. As shown in FIG. 2, cell 10 may have a cylindrical or tubular shape with attached tubular fittings, but can also have a shape in the configuration of a multi-sided polygon. Anode compartment 20 has an anode opening 22 to allow placement of an anode 70 positioned within anode compartment 20. Anode 70 has an anode stem 71 connected perpendicular to an anode face 72. The inside dimensions of anode compartment 20 at anode opening 22 must be slightly larger than the dimensions of anode face 72. Cathode compartment 30 has a cathode opening 32 to allow placement of a cathode 80 positioned within cathode compartment 30. Cathode 80 has a cathode stem 81 connected perpendicular to a cathode face 82. The inside dimensions of cathode compartment 30 at cathode opening 32 must be slightly larger than the dimensions of cathode face 82. The junction of anode compartment 20 and cathode compartment 30 of cell 10 includes an anode flange 21 and a cathode flange 31. As shown by FIG. 2, anode flange 21 and cathode flange 31 are circular in configuration. Size and shape of anode flange 21 and cathode flange 31 are primarily dependent on the dimensions of cell compressive collar 40.

Anode compartment 20 and cathode compartment 30 are hydraulically isolated from the outside environment by an anode seal 60 and a cathode seal 61. Anode seal 60 and cathode seal 61 are made of flexible synthetic material of variable thickness and shape having elastic properties including butyl rubber; ethylene polypropylene rubber such as EPDM, EPT, EPR; chloroprene rubber such as Norprene®; or fluorine rubber such as Viton®. The material for anode seal 60 should be chemically resistant to the anolyte contained in anode compartment 20, and the material for cathode seal 61 should be chemically resistant to the catholyte in cathode compartment 30. Anode seal 60 and cathode seal 61 further having a hardness less than 90 durometer, preferably less than 70 durometer. In this particular example, cathode seal 61 consists of a 3 millimeter (⅛ inch) thick flat EPDM rubber sheet having the same dimensions of cathode flange 31. Anode seal 60 consists of a 6.35 millimeter (¼ inch) diameter Viton® rubber o-ring material in communication with a flange groove 62, or depression encompassing the surface of anode flange 21.

Anode compartment 20 is in open communication with cathode compartment 30 through anode opening 22 encompassed by anode flange 21 and cathode opening 32 encompassed by cathode flange 31. Anode compartment 20 is hydraulically isolated from cathode compartment 30 by a membrane 50. Membrane 50 is a cation selective permionic membrane typically fabricated of a fluorocarbon resin containing active acid groups such as carboxylic acid sulfonic acid groups, derivatives of these groups, or mixture of two or more of those groups. Membrane 50 may include a PTFE reinforcement mesh to add structural rigidity. Thus membrane 50 provides electrically conductive communication between anode compartment 20 and cathode compartment 30. The dimensions of membrane 50 encompass the area between the outside edge of anode gasket 60 and the outer edge circumference of anode flange 21. In this particular example, membrane 50 has an approximate diameter of 13 centimeters (5 inches).

A wedge or threaded configuration cell compression collar 40 uniformly compresses membrane 50 between anode seal 60 fitted within flange groove 62 on anode flange 21 and cathode seal 61 on cathode flange 31. Cell compression collar 40 is made of a rigid material such as fiberglass, polyvinyl chloride (PVC) plastic, chlorinated polyvinyl chloride (CPVC) plastic, polyvinylidene fluoride (PVDF) plastic, polytetrafluoroethylene (PTFE) plastic, high density polyethylene (HDPE) plastic, or various types of metal including stainless steel, aluminum, and titanium. Cell compressive collar 40 encompasses anode flange 21 and cathode flange 31.

FIG. 2 illustrates a 5, 7.6, or 10 centimeter (2, 3, or 4 inch) diameter union pipe fitting having an exterior compression wedge 41 or thread firmly attached or contiguous with the exterior circumference of cathode flange 31, and an interior compression wedge 42 or thread firmly attached or contiguous with the interior of cell compression collar 40. A compression collar opening 44, defined by the interior circumference of a compression collar flange 45 on cell compression collar 40, must be larger in diameter than the exterior dimensions of cell 10 at the junction of anode flange 21 and smaller in diameter that the outside circumference of anode flange 21. Cell compression collar 40 is rotative having interior compression wedge 42 in symmetrical connective communication with exterior compression wedge 41. The interior surface of compression collar flange 45 is in symmetrical communication with the back exterior surface of anode flange 21 where the surface of compression collar flange 45 meets the back surface of anode flange 21 when interior compression wedge 42 is fully engaged within exterior compression wedge 41.

Anode flange 21 is hydraulically connected to an anolyte container 25 by an anode compartment connector 27. Connection of anode compartment connector 27 to anode flange 21 and anolyte container 25 is by wedge communication, tapered wedge communication, glue cementing, or material fusion processes. Anolyte container 25 is connected to an anode compartment base 28 providing closed communication to the exterior environment. Connection of anolyte container 25 to anode compartment base 28 is by wedge communication, tapered wedge communication, glue cementing, or material fusion processes. Anolyte container 25 is connected to an anode lid 24 providing controlled closed communication to the exterior environment. Connection of anolyte container 25 to anode lid 24 is by tapered wedge communication or wedge communication providing access to anolyte container 25 interior. Anode lid 24 includes an anolyte port 29 providing controlled communication between the interior anode compartment 20 and other external system processes. Additional tubular or pipe fittings can be added to anolyte container 25 on either the bottom or the top, or both for increased anolyte volume or positional stability.

Cathode flange 31 is hydraulically connected to a catholyte container 35 by a cathode compartment connector 37. Connection of cathode compartment connector 37 to cathode flange 31 and catholyte container 35 is by wedge communication, tapered wedge communication, glue cementing, or material fusion processes. Catholyte container 35 is connected to a cathode compartment base 38 providing closed communication to the exterior environment. Connection of catholyte container 35 to cathode compartment base 38 is by wedge communication, tapered wedge communication, glue cementing, or material fusion processes. Catholyte container 35 is connected to a cathode lid 34 providing controlled closed communication to the exterior environment. Connection of catholyte container 35 to cathode lid 34 is by tapered wedge communication or wedge communication providing access to catholyte container 35 interior. Cathode lid 34 includes a catholyte port 39 providing controlled communication between the interior cathode compartment 30 and other external system processes. Additional tubular or pipe fittings can be added to catholyte container 35 on either the bottom or the top, or both for increased catholyte volume or positional stability.

FIG. 3 illustrates anode 70 positioned within anode compartment 20 through anode opening 22 defined by the interior dimension of anode flange 21. Anode 70 is made of an electrically conductive material that is chemically resistant to the chlorine gas and anolyte in anode compartment 20. Such material includes graphite carbon, or titanium, zirconium, niobium, tungsten or tantalum having a coating of an electrically conductive electrocatalytically material of platinum rhodium, iridium, ruthenium, osmium or palladium, and/or oxide of one or more of these metals. One common example is a platinum coated titanium anode with a solid or mesh form. Cell compression collar 40 consisting of a 7.6 centimeter (3 inch) diameter CPVC union pipe fitting, anode compartment 20 consisting of a 7.6 centimeter (3 inch) diameter schedule 80 CPVC pipe, requires a 7 centimeter (2.75 inch) diameter anode face 72 which produces from 0.01–1.0 kilograms (0.02–2.2 pounds) of chlorine gas per cell per day. Anode 70 further having anode stem 71 of same material that is rigidly attached or welded to anode 70 and extending horizontally out of anode compartment 20 through an anode stem opening 26 at the outward side of anode compartment 20 opposite of anode opening 22. Anode stem 71 may be a threaded stem 6.35 millimeter (¼ inch) in diameter and 23–24 centimeters (9 inches) long, welded perpendicular at right angles to the center inside face of anode face 72.

Anode stem opening 26 is environmentally sealed by an anode stem seal 63 between anode stem 71 and anode compartment 20 at anode stem opening 26. Anode stem seal 63 is made of flexible synthetic material of variable thickness and shape having elastic properties including butyl rubber; ethylene polypropylene rubber such as EPDM, EPT, EPR; chloroprene rubber such as Norprene®; or fluorine rubber such as Viton®. More specifically, the material for anode stem seal 63 should be chemically resistant to the chlorine gas and anolyte contained in anode compartment 20, and have a hardness less than 90 durometer, preferably less than 70 durometer. In this particular example, anode stem seal 63 is a tubular material encompassing anode stem 71. Anode stem seal 63 having a hollow interior diameter similar to, or slightly smaller than anode stem 71 diameter. Anode stem seal 63 exterior diameter is slightly larger than anode stem opening 26 diameter.

FIG. 3 further illustrates cathode 80 positioned within cathode compartment 30 through cathode opening 32 defined by the interior dimension of cathode flange 31. Cathode 80 is made of an electrically conductive material that is chemically resistant to the hydrogen gas and catholyte in cathode compartment 30. Such material includes titanium, iron or steel, or of other suitable metal such as nickel. The size of cathode 80 must be slightly smaller that the dimensions of cathode opening 32, and preferably the same size of anode 70. Cathode 80 further having a cathode stem 81 of same material that is rigidly attached or welded to cathode face 82 and extending horizontally out of cathode compartment 30 through a cathode stem opening 36 at the end of cathode compartment 30 opposite of cathode opening 32. Cathode stem 81 may be a threaded stem 9–10 millimeter (⅜ inch) in diameter and 23–24 centimeters (9 inches) long, welded perpendicular at right angles to the center inside face of cathode face 82.

Cathode stem opening 36 is environmentally sealed by compression of a cathode stem seal 65 between cathode stem 81 and cathode compartment 30 at cathode stem opening 36. Cathode stem seal 65 is made of flexible synthetic material of variable thickness and shape having elastic properties including butyl rubber; ethylene polypropylene rubber such as EPDM, EPT, EPR; or chloroprene rubber such as Norprene®. More specifically, the material for cathode stem seal 65 should be chemically resistant to the hydrogen gas and catholyte contained in cathode compartment 30, and having a hardness of less than 90 durometer, preferably less than 70 durometer. In this particular example, cathode stem seal 65 is a tubular material encompassing cathode stem 81. Cathode stem seal 65 having a hollow interior diameter similar to, or slightly smaller than cathode stem 81 diameter. Cathode stem seal 65 exterior diameter is slightly larger than cathode stem opening 36 diameter.

As shown in FIG. 1, anode stem 71 and cathode stem 81 portions that exit cell 10 exterior are independently connected by an electrical conduit 90 to the output of a power supply 91. Electrical conduit 90 is a copper wire or cable of sufficient size to transmit the direct current amperage loading from power supply 91 to cell 10. In this particular example, electrical conduit 90 is a # 10 AWG size stranded copper wire capable of transmitting 15–30 direct current amperes from power supply 91 to cell 10.

Power supply 91 may be electrically connected to a power control 92 having a plug receptacle 94, a dimmer switch 95 and a power cord 96. Power cord 96 is electrically connected in series to dimmer switch 95 further connected in series to plug receptacle 94. Power cord 96 is electrically connected to an alternating current power supply 99. In this particular example, alternating current power supply 99 is a 120 volt alternating current (VAC) electrical energy source. Power cord 96 is a three wire # 16 AWG size stranded copper wire capable of transmitting 10 alternating current amperes from alternating current power supply 99 to power control 92. Dimmer switch 95 is an SCR switch or variable solid state voltage regulator switch rated at 300 watts or more. Plug receptacle 94 is a three prong receptacle capable of receiving a typical 120 VAC power cord plug and capable of transmitting 15 amperes of alternating current.

Operation of Invention

It should be understood that FIG. 2 depicts cell 10 in the pre-assembly mode. The illustration of the pre-assembly mode depicts the various elements of cell 10 prior to assembly of cell 10. It should be further understood that FIGS. 1 and 3 depict cell 10 in the assembled mode. The illustration of the assembled mode depicts the configuration of cell 10 ready for operation.

To establish an operable cell 10 as shown in FIG. 1, the components of cell 10 must be assembled as illustrated in FIG. 2. To assemble anode compartment 20, anode stem seal 63 is positioned within anode stem opening 26 of anode compartment 20. Anode 70 is then placed within anode compartment 20 through anode opening 22. Anode stem 71 is inserted through the hollow tubular opening of anode stem seal 63 providing a compressive seal between anode stem 71 and anode compartment 20 compresses at anode stem opening 26. Anode 70 is positioned directly behind anode opening 22 with anode stem 71 extending horizontally outward through anode stem opening 26.

The assembly of cathode compartment 30 follows the same procedures as described in the assembly of anode compartment 20. Nonetheless, cathode stem seal 65 is positioned within cathode stem opening 36 of cathode compartment 30. Cathode 80 is then placed within cathode compartment 30 through cathode opening 32. Cathode stem 81 is inserted through the hollow tubular opening of cathode stem seal 65 providing a compressive seal between cathode stem 81 and cathode compartment 30 compresses at cathode stem opening 36. Cathode 80 is positioned directly behind cathode opening 32 with cathode stem 81 extending horizontally outward through cathode stem opening 36.

Following installation of anode 70 in anode compartment 20 and cathode 80 in cathode compartment 30, membrane 50 is positioned between anode seal 60 on anode flange 21 and cathode seal 61 on cathode flange 31, providing electrically conductive communication between anode opening 22 and cathode opening 32. With cell 10 remaining fixed in position, cell compression collar 40 having interior compression wedge 42 is rotated onto exterior compression wedge 41 which is rigidly attached or contiguous with the exterior circumference of cathode flange 31. Interior compression wedge 42 being in connective communication with exterior compression wedge 41 allows compression collar flange 45 to uniformly seat or meet with the exterior back surface of anode flange 21. When the interior surface of compression collar 45 meets the exterior back surface of anode flange 21, the wedging or squeezing developed by the added torque or rotational force applied to cell compression collar 40 between interior compressive wedge 42 and exterior compressive wedge 41 redistributes the torque or rotational force to a compression force between anode flange 21 and cathode flange 31. The compressive force is applied symmetrically along anode seal 60 and cathode seal 61, thus sealing the interior of cell 10 from the outside environment. Frictional properties between the surface of interior compressive wedge 42 and the surface of exterior compressive wedge 41 of cell compression collar 40 maintains symmetrical compression of anode seal 60 on anode flange 21 and cathode seal 61 on cathode flange 31 when the torque or rotational force is removed.

Salt and water added to anode compartment 20 provide the means for anolyte solution. Water or sodium hydroxide added to cathode compartment 30 provide means for catholyte solution. Electrical conduit 90 is then connected to the environmentally exposed portion of anode stem 71 and cathode stem 81. Cell 10 is further connected to any other necessary appurtenances including direct current power supply 91 and perhaps power control 92 to allow proper operation of the chlor-alkali process. Chlorine gas generated from anolyte compartment 20 exits through anolyte port 29 to the desired chlorine application. Hydrogen gas generated from the catholyte compartment 30 exits through catholyte port 39 to the atmosphere.

Routine maintenance of cell 10 requires the addition of salt and water to the anode compartment 20, addition of dilution water to cathode compartment 30, and removal of membrane 50 for cleaning, treatment, or replacement. Removal of membrane 50 is accomplished by applying a torque or rotational force to cell compression collar 40 in the opposite direction stipulated in the assembly mode. The amount of torque or rotational force required to release cell 10 from cell compression collar 40 must exceed the static frictional force existing between the surface of interior compressive wedge 42 and the surface of exterior compressive wedge 41 of cell compression collar 40. Addition of salt and water to anode compartment 20 is accomplished by removal of anode lid 24 to access the interior of anode compartment 20. Anode lid 24 can be a clear plastic or glass material to allow for visual observation of anode compartment 20 interior. A hydrometer used for testing batteries can be used to measure the density of sodium hydroxide in cathode compartment 30. Dilution water is manually added to cathode compartment 30 when the excessive upper density limit is exceeded. The excess sodium hydroxide removed from cathode compartment 30 is disposed down a drain, kept for future cell operation, or used and needed in other treatment processes.

Conclusions, Ramifications, and Scope of Invention

As with the prior art, the novel apparatus depicted above provides a simple means to install a membrane that hydraulically isolates the anode compartment from the cathode compartment of a typical chlor-alkali cell. In addition, this invention is simple and economical to assemble from readily available components found in many areas of the world. Furthermore, the apparatus allows the addition of salt and water to the cell without removal of the electrodes. Certainly, the size of the system promotes portability without the need for a handle; however additional tubing or piping can be added to increase the cell size as desired. Lastly, the power control allows the operator us adjust any power supply to the optimum level of energy providing a range of chlorine needs with one single cell.

It will thus be seen that the objects set forth above, and those made apparent from the foregoing description, are efficiently attained and since certain changes may be made in the above construction without departure from the scope of the invention, it is intended that all matters contained in the foregoing description or shown in the accompanying shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What I claim as my invention is:

1. A portable chlorine generator, comprising:

an anode compartment, a cathode compartment, and an ion selective membrane positioned between said anode compartment and said cathode compartment;

said ion selective membrane positioned between said cathode compartment and said anode compartment providing hydraulic isolation between said cathode compartment and said anode compartment;

said ion selective membrane being efficient in preventing the passage of chloride ions from said anode compartment to said cathode compartment;

said anode compartment and said cathode compartment utilizing a cell compression collar to provide positioning of said ion selective membrane and connectivity of said anode compartment with said cathode compartment;

said anode compartment having an anode compartment access means providing access to said anode compartment interior while said cell compression collar is fully engaged;

said anode compartment access means having sufficient size to allow the addition of a solid material and a liquid to said anode compartment;

said cathode compartment having a cathode compartment access means providing access to said cathode compartment interior while said cell compression collar is fully engaged;

said cathode compartment access means having sufficient size to allow the addition or removal of a liquid to said cathode compartment;

said cathode compartment utilizing a pipe fitting connective to base of said cathode compartment;

said pipe fitting having a long member with two cross-sectional openings in straight open connectivity at opposite ends of said long member and a short member with one cross-sectional opening in perpendicular open connectivity with said long member near midpoint of said long member;

said pipe fitting positioned where a portion of said long member outer perimeter is engaged horizontally with a supporting floor and said short member vertically positioned near perpendicular to said supporting floor;

said short member is vertically connected to said cathode compartment;

said long member with two openings being plugged or capped to prevent leakage of liquid or material from said cathode compartment;

said pipe fitting positioned with centerline of said long member at a sufficient horizontal angle relative to centerline of engaged said cathode compartment and said anode compartment providing gravitational support and stability of said portable chlorine generator;

an anode disposed in said anode compartment having an anode face placed nearby said ion selective membrane;

said anode having an anode stem exiting said anode compartment through a sealing means;

a cathode disposed in said cathode compartment having a cathode face placed nearby said ion selective membrane;

said cathode having a cathode stem exiting said cathode compartment through a sealing means;

a gas outlet means communicating with said anode compartment and said cathode compartment; and said anode stem and said cathode stem are connective to a power supply.

2. The portable chlorine generator as defined in claim 1, wherein said pipe fitting is a tee pipe fitting.

3. The portable chlorine generator as defined in claim 2, wherein said tee pipe fitting is used in similar fashion on said anode compartment.

4. A portable chlorine generator, comprising:

an anode compartment, a cathode compartment, and an ion selective membrane positioned between said anode compartment and said cathode compartment;

said ion selective membrane positioned between said cathode compartment and said anode compartment providing hydraulic isolation between said cathode compartment and said anode compartment;

said ion selective membrane being efficient in preventing the passage of chloride ions from said anode compartment to said cathode compartment;

said anode compartment and said cathode compartment utilizing a cell compression collar to provide positioning of said ion selective membrane and connectivity of said anode compartment with said cathode compartment;

said anode compartment having an anode compartment access means providing access to said anode compartment interior while said cell compression collar is fully engaged;

said anode compartment access means having sufficient size to allow the addition of a solid material and a liquid to said anode compartment;

said cathode compartment having a cathode compartment access means providing access to said cathode compartment interior while said cell compression collar is fully engaged;

said cathode compartment access means having sufficient size to allow the addition or removal of a liquid to said cathode compartment;

said cathode compartment utilizing a tee pipe fitting for said cathode compartment base;

said tee pipe fitting positioned as to provide gravitational support and stability of said portable chlorine generator;

an anode disposed in said anode compartment having an anode face placed nearby said ion selective membrane;

said anode having an anode stem exiting said anode compartment through a sealing means;

a cathode disposed in said cathode compartment having a cathode face placed nearby said ion selective membrane;

said cathode having a cathode stem exiting said cathode compartment through a sealing means;

a gas outlet means communicating with said anode compartment and said cathode compartment; and said anode stem and said cathode stem are connective to a power supply.

5. The portable chlorine generator as defined in claim 4, wherein said tee pipe fitting is used in similar fashion on said anode compartment.

6. A method of generating chlorine utilizing a power supply, power controller containing a voltage adjustment switch, and an electrolysis cell containing, an anode compartment with an anode and anolyte comprised of pipe fittings supported by a tee pipe fitting base, a cathode compartment with a cathode and catholyte comprised of pipe fittings supported by a tee pipe fitting base, and an ion selective membrane positioned between said anode compartment and said cathode compartment, said method comprising the steps of;

assembly of said pipe fittings to form said electrolysis cell housing said anode and said cathode;

connecting said power supply to said anode and said cathode;

connecting said power controller to said power supply; and regulation of said voltage adjustment switch of said power controller to manipulate energy output of said power supply thus providing the desired chlorine output with any said power supply.

* * * * *